(12) United States Patent
Liu et al.

(10) Patent No.: US 9,983,026 B2
(45) Date of Patent: May 29, 2018

(54) MULTI-LEVEL ROTATIONAL RESOLVERS USING INDUCTIVE SENSORS

(71) Applicant: Texas Instruments Incorporated, Dallas, TX (US)

(72) Inventors: Dongtai Liu, Fremont, CA (US); George P. Reitsma, Redwood City, CA (US); Evgeny Fomin, San Carlos, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 117 days.

(21) Appl. No.: 14/853,842

(22) Filed: Sep. 14, 2015

(65) Prior Publication Data

US 2016/0091342 A1    Mar. 31, 2016

Related U.S. Application Data

(60) Provisional application No. 62/055,467, filed on Sep. 25, 2014.

(51) Int. Cl.
    *G01B 7/30*    (2006.01)
    *G01D 5/20*    (2006.01)
    *G01D 5/243*   (2006.01)

(52) U.S. Cl.
    CPC .............. *G01D 5/20* (2013.01); *G01D 5/2006* (2013.01); *G01D 5/243* (2013.01)

(58) Field of Classification Search
    CPC ...... G01D 5/20; G01D 5/2006; G01D 5/2046; G01D 5/2053; B60W 2420/506; G06K 7/082; G06K 7/10158; H05K 2201/086; Y10S 336/00; Y10S 505/87; E21B 47/02216; G01S 13/88; G01V 3/00; G01V 3/08; G01V 3/15; G01V 3/165;

(Continued)

(56) References Cited

U.S. PATENT DOCUMENTS 2,621,514 A * 12/1952 Waugh ................... G01L 3/104
    324/207.18
3,505,865 A *  4/1970 Bystrom ................ G01L 3/101
    336/30

(Continued)

FOREIGN PATENT DOCUMENTS

| | | |
|---|---|---|
| RU | 2403204 C1 | 11/2010 |
| SU |  887921 A1 | 12/1981 |
| SU | 1728642 A1 |  4/1992 |

OTHER PUBLICATIONS

International Search Report, dated Jan. 21, 2016.

*Primary Examiner* — Patrick Assouad
*Assistant Examiner* — Demetrius Pretlow
(74) *Attorney, Agent, or Firm* — Andrew Viger; Charles A. Brill; Frank D. Cimino

(57) ABSTRACT

A rotational resolver system and method includes a rotational shaft to which at least one eccentric conductive coarse resolution disc is fixed and to which at least one conductive fine resolution disc is also fixed. The fine resolution disc defines a plurality of generally semicircular protruding edge segments. At least one conductive coarse-disc sensing coil is disposed adjacent an edge of the coarse resolution disc, and at least one conductive fine-disc sensing coil is disposed adjacent the edge of the fine resolution disc. These coils may be oriented for axial sensing of the respective disc.

20 Claims, 7 Drawing Sheets

(58) Field of Classification Search
CPC .... G01B 7/003; G01J 5/24; G01J 2001/1631; G01K 7/20; G01K 7/24; G01K 7/28; G01R 17/00; G01R 17/14; G01R 17/16; G01R 27/2629; H03F 3/3081; H03K 2217/96075
See application file for complete search history.

(56) References Cited

U.S. PATENT DOCUMENTS

| | | | | |
|---|---|---|---|---|
| 4,122,709 A | * | 10/1978 | Brown | G01L 3/101 324/76.82 |
| 4,136,559 A | * | 1/1979 | Brown | G01L 3/101 324/76.82 |
| 4,755,751 A | * | 7/1988 | Ray | H02K 24/00 318/661 |
| 5,675,095 A | * | 10/1997 | Ballantyne | G01L 3/1435 73/862.321 |
| 6,118,283 A | | 9/2000 | Cripe | |
| 8,723,510 B2 | * | 5/2014 | Nakamura | G01B 7/30 324/207.15 |
| 2010/0181995 A1 | * | 7/2010 | Inoue | G01B 7/003 324/207.16 |
| 2013/0113467 A1 | | 5/2013 | Sasada | |

\* cited by examiner

| RESOLUTION | 36000 | PER TURN |
| --- | --- | --- |
| NUMBER OF LEVELS | 1 | |
| INDUCTANCE DROP | 40 | % |
| INDUCTANCE TO DIGITAL CONVERTER COUNTING FREQUENCY | 40 | MHz |
| ROTATION SPEED | 0.42 | rpm |

| ROTATION SPEED | 60 | rpm |
| --- | --- | --- |
| NUMBER OF LEVELS | 1 | |
| INDUCTANCE DROP | 40 | % |
| INDUCTANCE TO DIGITAL CONVERTER COUNTING FREQUENCY | 40 | MHz |
| RESOLUTION | 3,003 | PER TURN |

MULTI-LEVEL ROTATIONAL RESOLVERS USING INDUCTIVE SENSORS

CROSS-REFERENCE TO RELATED APPLICATIONS

The present application claims the benefit of the filing date of U.S. Provisional Patent Application Ser. No. 62/055,467, entitled MULTI-LEVEL ROTATIONAL RESOLVER BASED ON INDUCTIVE SENSING, filed Sep. 25, 2014, which is incorporated herein by reference in its entirety.

TECHNICAL FIELD

Embodiments of the invention are directed, in general, to rotational position and/or speed sensing and, more specifically, to multi-level high resolution rotation position and speed sensing rotational resolvers using inductive sensors.

BACKGROUND

Historically, rotational position sensing has been implemented using predominantly mechanical contact-based systems. These systems are prone to break down and consequently expensive replacement over their lifetimes due to the moving parts. Alternate solutions using optical sensing are not immune to dirt and dust, which is a constraint for many industrial applications, and the like. Alternate solutions using Hall sensors rely on permanent magnets that suffer from large production variations, and hence need extensive calibration, etc.

A traditional resolver is a type of rotary electrical transformer used for measuring degrees of rotation. It is considered an analog device and consists of a stator input coil, output coil and rotor. Inductive sensing is a contactless sensing technology that offers a durable rotational position sensing implementation. This technology is extremely resistant to harsh environments along with being generally water and dirt proof, as well. In rotational sensing, the use of multiple inductance coils enables continuous 360-degree angular position sensing, and can also increase sensing accuracy.

In existing single level inductance to digital converter-based rotational resolvers system, rotational resolution is typically limited by factors such as mechanical variation s with the resolver especially along axial direction, temperature changes, conflicting requirements of resolution and speed, etc. For example, in a conventional 8192-position resolver an inductance to digital converter can only support a rotational speed on the order of 3.8 rpm; a one percent change in axial proximity may cause position error in an order of magnitude of a hundred; and when temperature changes 70 degrees C. the position error is typically on in an order of magnitude of ten.

SUMMARY OF THE INVENTION

Embodiments of the invention provide a rotational resolver that includes a rotational shaft to which at least one conductive eccentric coarse resolution disc is fixed, and to which at least one conductive fine resolution disc is also fixed. The fine resolution disc defines a plurality of generally semicircular protruding edge segments. At least one conductive coarse-disc sensing coil is disposed adjacent an edge of the coarse resolution disc, and at least one conductive fine-disc sensing coil is disposed adjacent the edge of the fine resolution disc. These coils may be oriented for axial sensing of the respective disc.

Rotation of the shaft, and thereby the discs, causes the distance between each coarse-disc sensing coil and the coarse resolution disc to cycle between a maximum distance and a minimum distance each rotation cycle, corresponding to one sensing cycle per rotation cycle. Whereas, rotation of the shaft, and thereby the discs, causes the distance between each fine-disc sensing coil and the fine resolution disc to cycle between a maximum, a minimum and back to the maximum during the passage of each edge segment, corresponding to a number of sensing cycles per rotation cycle equal to the number of edge segments.

The coarse-disc sensing coils may be (a) pair(s) of coarse-disc sensing coils including an in-phase coarse-disc sensing coil and a quadrature coarse-disc sensing coil. Similarly, the fine-disc sensing coils may be (a) pair(s) of fine-disc sensing coils including an in-phase fine-disc sensing coil and a quadrature fine-disc sensing coil.

Some implementations may employ a pair of conductive fine resolution discs, with one conductive coarse resolution disc disposed between the conductive fine resolution discs. Therein, a first of the fine resolution discs may be disposed in-phase and a second of the fine resolution discs may be disposed in quadrature with respect to the first fine resolution disc. In such implementations, rotation of the shaft ant thereby the discs causes the distance between each fine-disc sensing coil and the fine resolution disc to cycle between a maximum, a minimum and back to the maximum during the passage of each edge segment, and the coil(s) disposed adjacent the edge of the first or second fine resolution disc outputs a generally sinusoidal-like cyclic first signal and the other conductive coil(s) disposed adjacent the edge of the other of fine resolution disc outputs a generally sinusoidal-like cyclic second signal that is generally quadrature to the first signal, (i.e. a cosine signal). Also, in such implementations, the coarse-disc sensing coil(s) comprises (a) pair(s) of coarse-disc sensing coils, which include an in-phase coarse-disc sensing coil and a quadrature coarse-disc sensing coil, and the fine-disc sensing coil(s) include (a) pair(s) of fine-disc sensing coils that include an in-phase fine-disc sensing coil and a quadrature fine-disc sensing coil. The in-phase fine-disc sensing coil(s) is (are) disposed adjacent to one of the fine resolution discs and the quadrature fine-disc sensing coil(s) is (are) disposed adjacent to the other fine resolution disc. The in-phase fine-disc sensing coil and the quadrature fine-disc sensing coil may be aligned with one another and disposed generally parallel to the shaft.

Thus, a method for rotational position sensing may call for mounting an eccentric conductive coarse resolution disc, on a shaft and mounting a conductive fine resolution disc defining a plurality of generally semicircular protruding edge segments on the shaft. In accordance with such a method for rotational position sensing (a) pair(s) of orthogonally positioned conductive coarse-disc sensing coils may be disposed adjacent an edge of the coarse resolution disc for axial sensing of the coarse resolution disc, and (a) conductive fine-disc sensing coil(s) may be disposed adjacent the edge of the fine resolution disc for axial sensing of the fine resolution disc. Such a method for rotational position sensing may call for rotating the shaft and thereby the discs, causing the distance between each coarse-disc sensing coil and the coarse resolution disc to cycle between a maximum distance and a minimum distance each rotation cycle, corresponding to one sensing cycle per rotation cycle, and also causing the distance between each fine-disc sensing coil and the fine resolution disc to cycle between a maximum, a minimum and back to the maximum during the passage of each edge segment, corresponding to a number of sensing cycles per rotation cycle equal to the number of edge segments. In such a method for rotational position sensing each of the conductive coarse-disc sensing coils senses the one sensing cycle per rotation cycle, and each of the one or more conductive fine-disc sensing coils senses a plurality of sensing cycles per rotation corresponding to a rotational position of the discs.

In some method implementations, each pair of orthogonally positioned conductive coarse-disc sensing coils may include an in-phase coarse-disc sensing coil and a quadrature coarse-disc sensing coil, and/or the fine-disc sensing coil(s) may include (a) pair(s) of fine-disc sensing coils that are made up of an in-phase fine-disc sensing coil and a quadrature fine-disc sensing coil.

Some implementations of a method for rotational position sensing may call for mounting a second conductive fine resolution disc defining a plurality of generally semicircular protruding edge segments on the shaft, such as with the coarse resolution disc disposed between the fine resolution discs, and with one of the fine resolution discs disposed in-phase and the other fine resolution disc disposed in quadrature with respect to the first fine resolution disc. In such method implementations, rotating the shaft, and thereby the discs, cause the distance between each fine-disc sensing coil and the fine resolution disc to cycle between a maximum, a minimum and back to the maximum during the passage of each edge segment. As a result, a conductive coil disposed adjacent the edge of one of the fine resolution discs outputs a generally sinusoidal-like cyclic first signal and another of coils disposed adjacent the edge of the other fine resolution disc outputs a generally sinusoidal-like cyclic second signal that is generally quadrature to the first signal. In such rotational position sensing method implementations, the fine-disc sensing coil(s) may be (a) pair(s) of fine-disc sensing coils that include an in-phase fine-disc sensing coil and a quadrature fine-disc sensing coil. This in-phase fine-disc sensing coil may be disposed adjacent to one of the fine resolution discs, with the quadrature coil fine-disc sensing disposed adjacent to the other fine resolution discs, generally aligned with the in-phase fine-disc sensing coil, and with the in-phase fine-disc sensing coil and the quadrature fine-disc sensing coil disposed generally parallel to the shaft.

Hence, a rotational position and speed sensing system may include an inductance to digital converter, a plurality of inductance tank circuits and rotational resolver(s) operatively coupled to the inductance to digital converter via the plurality of inductance tank circuits. In such a system, the rotational resolver may include the rotational shaft, a conductive eccentric coarse resolution disc fixed on the shaft, and a conductive fine resolution disc fixed on the shaft, with the fine resolution disc defining a plurality of generally semicircular protruding edge segments. Conductive coarse-disc sensing coil(s) are disposed adjacent an edge of the coarse resolution disc such that rotation of the shaft, and thereby the discs, cause the distance between each coarse-disc sensing coil and the coarse resolution disc to cycle between a maximum distance and a minimum distance each rotation cycle, resulting in output of an inductance signal to the inductance to digital converter corresponding to one sensing cycle per rotation cycle. Conductive fine-disc sensing coil(s) are disposed adjacent the edge of the fine resolution disc such that rotation of the shaft, and thereby the discs, cause the distance between each fine-disc sensing coil and the fine resolution disc to cycle between a maximum, a minimum and back to the maximum during the passage of each edge segment, causing output of a (sinusoidal-like cyclic) inductance signal to the inductance to digital converter corresponding to a rotational position of the discs. These rotational resolver coils may be oriented for axial sensing of the respective disc. The rotational resolver coarse-disc sensing coil(s) may include (a) pair(s) of coarse-disc sensing coils that have an in-phase coarse-disc sensing coil and a quadrature coarse-disc sensing coil and/or fine-disc sensing coil pair(s) including an in-phase fine-disc sensing coil and a quadrature fine-disc sensing coil.

In some systems, the rotational resolver has a pair of conductive fine resolution discs, with one conductive coarse resolution disc disposed therebetween. One of the fine resolution discs may be disposed in-phase and the other fine resolution discs may be disposed in quadrature with respect to the first fine resolution disc. In such systems, rotation of the shaft and thereby the discs cause the distance between each fine-disc sensing coil and the fine resolution disc to cycle between a maximum, a minimum and back to the maximum during the passage of each edge segment, and the conductive coil(s) disposed adjacent the edge of one of the fine resolution discs outputs a generally sinusoidal-like cyclic first signal to the inductance to digital converter and the other conductive coil(s) disposed adjacent the edge of the other fine resolution disc outputs a generally sinusoidal-like cyclic second signal, which is generally quadrature to the first signal, to the inductance to digital signal converter. Also in such systems, the rotational resolver coarse-disc sensing coil(s) include (a) pair(s) of coarse-disc sensing coils having an in-phase coarse-disc sensing coil and a quadrature coarse-disc sensing coil, and (a) pair(s) of fine-disc sensing coils having an in-phase fine-disc sensing coil and a quadrature fine-disc sensing coil. Therein, the in-phase fine-disc sensing coil is disposed adjacent to one of the fine resolution discs and the quadrature fine-disc sensing coil is disposed adjacent to the other fine resolution disc, generally aligned with the in-phase fine-disc sensing coil and with the in-phase fine-disc sensing coil and the quadrature fine-disc sensing coil disposed generally parallel to the rotational resolver shaft.

BRIEF DESCRIPTION OF THE DRAWINGS

Figure 1:
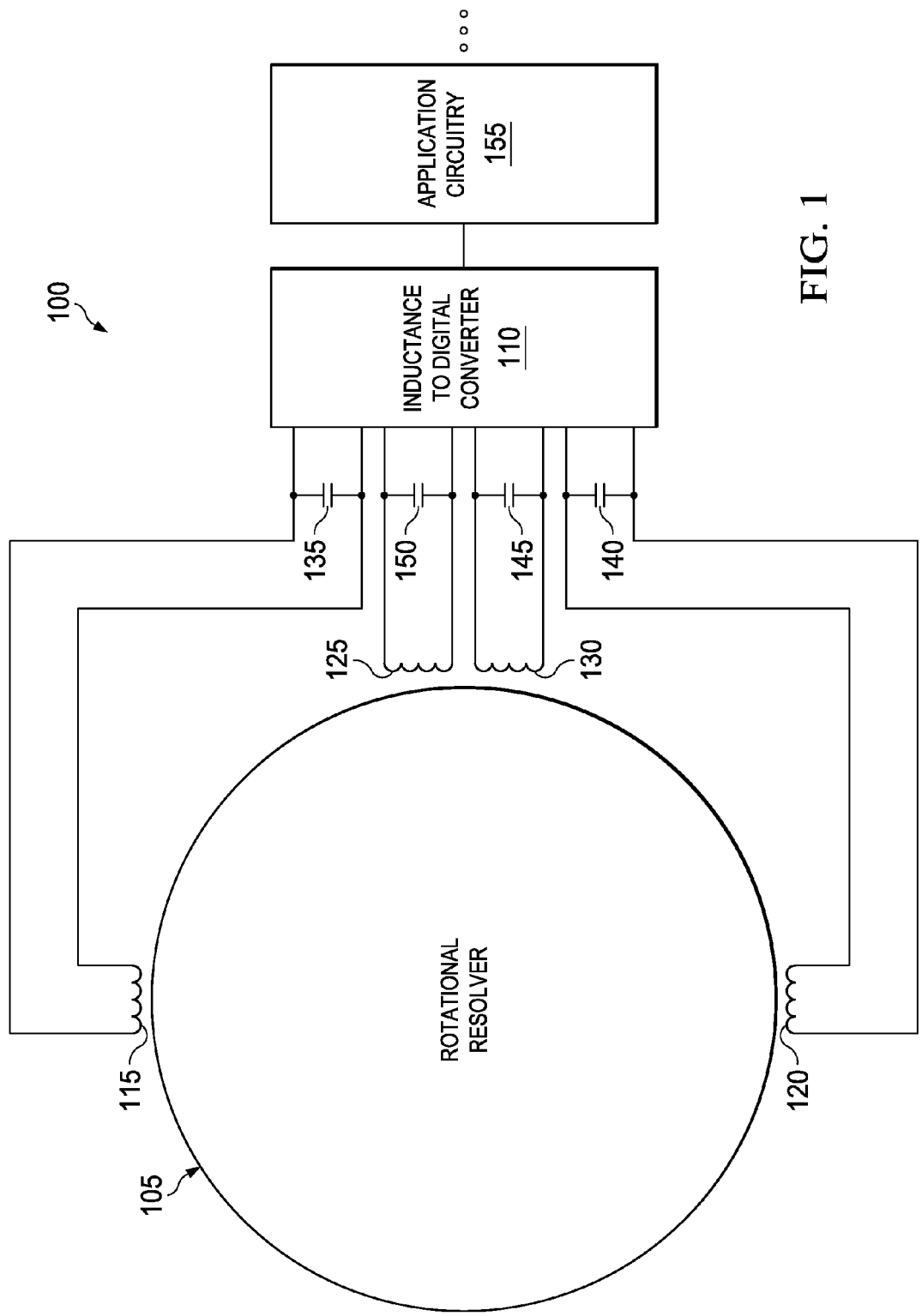
Figure 2:
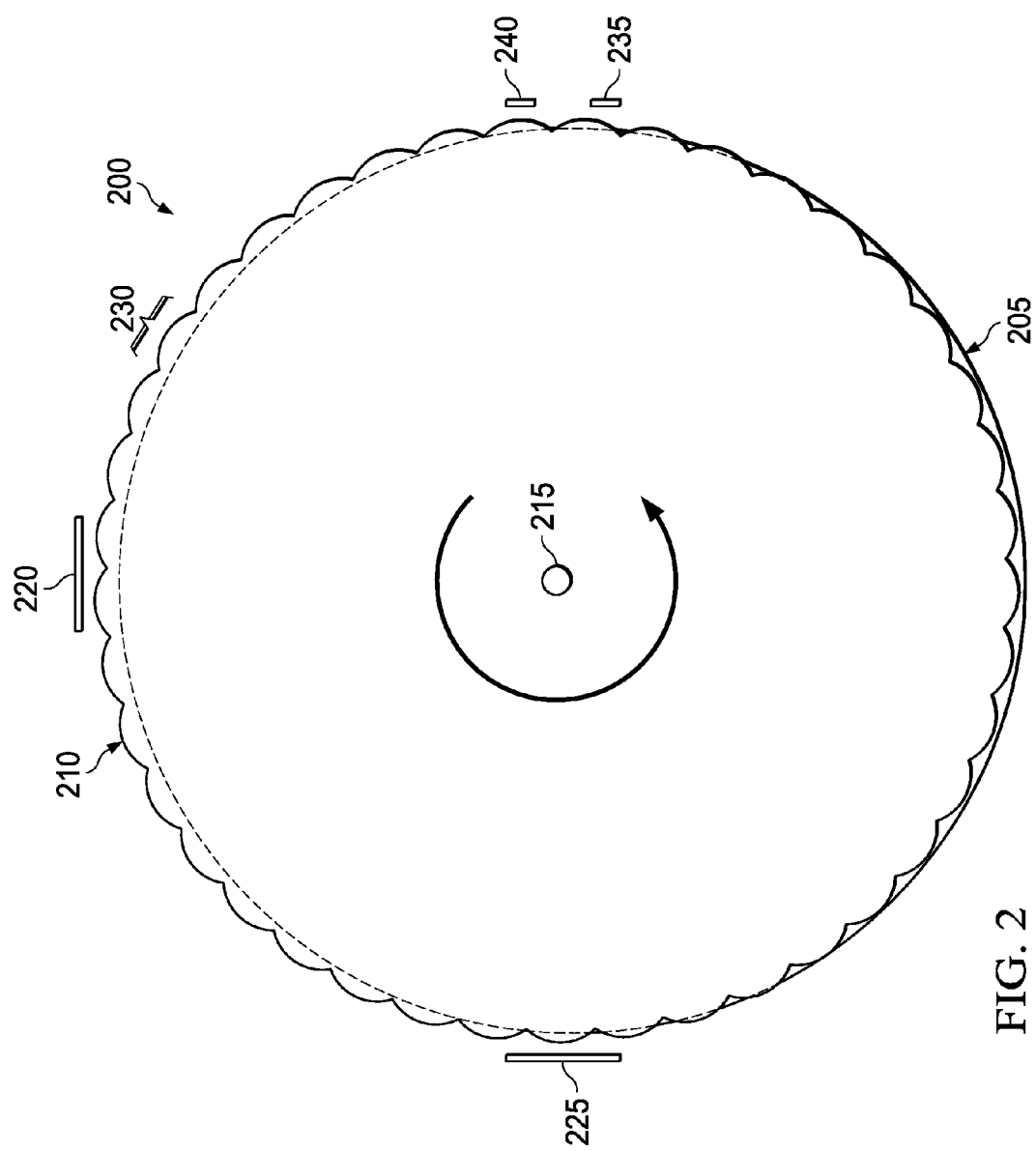
Figure 3:
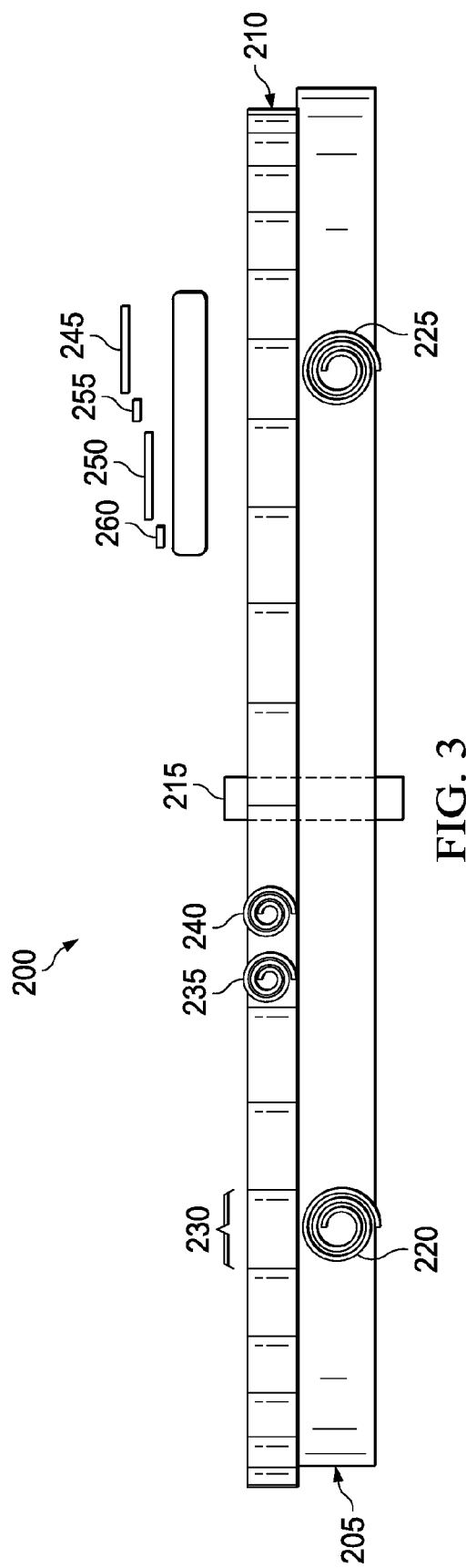
Figure 4:
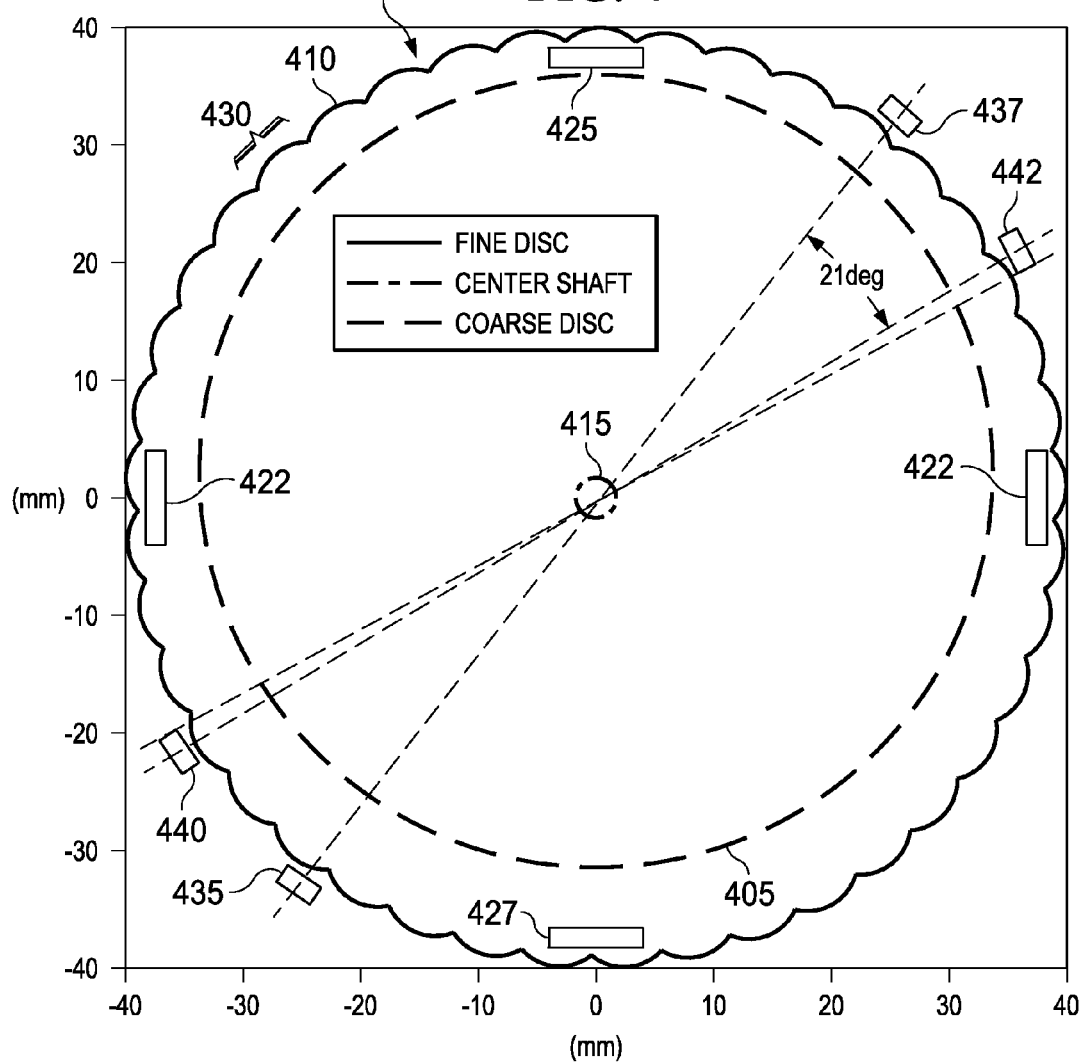
Figure 5:
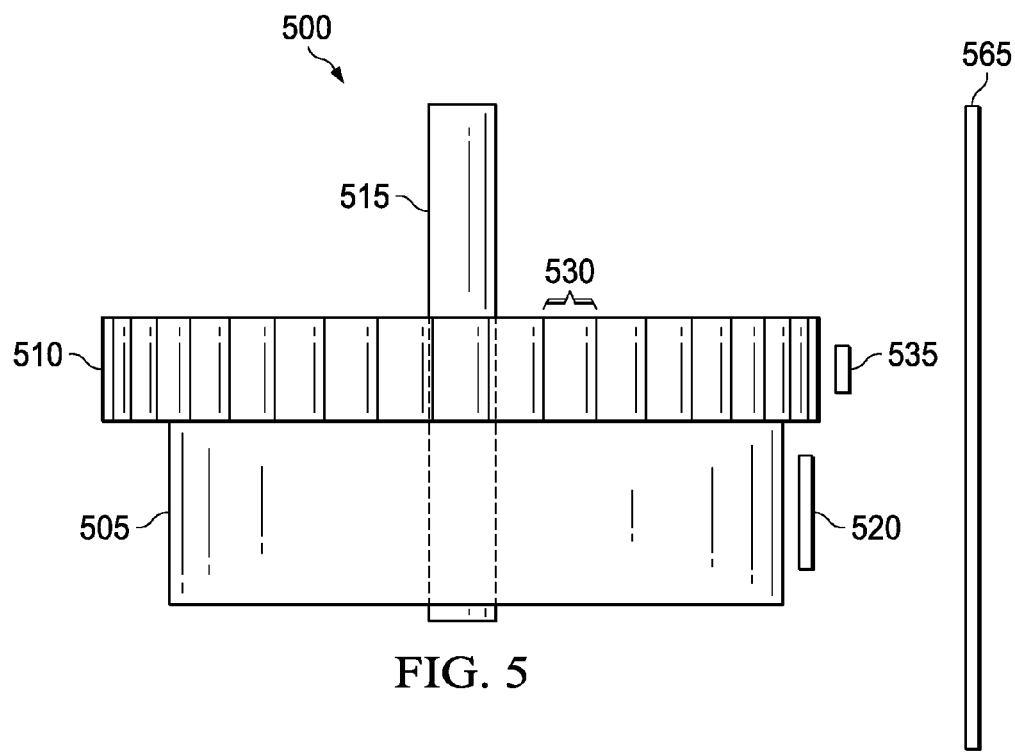
Figure 6:
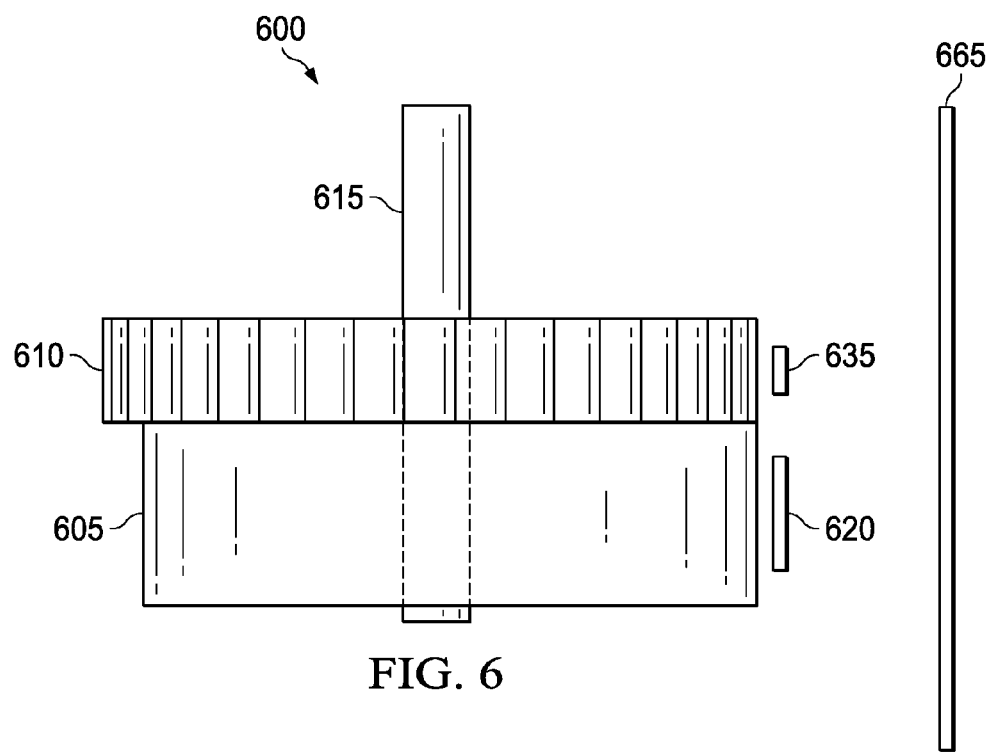
Figure 7:
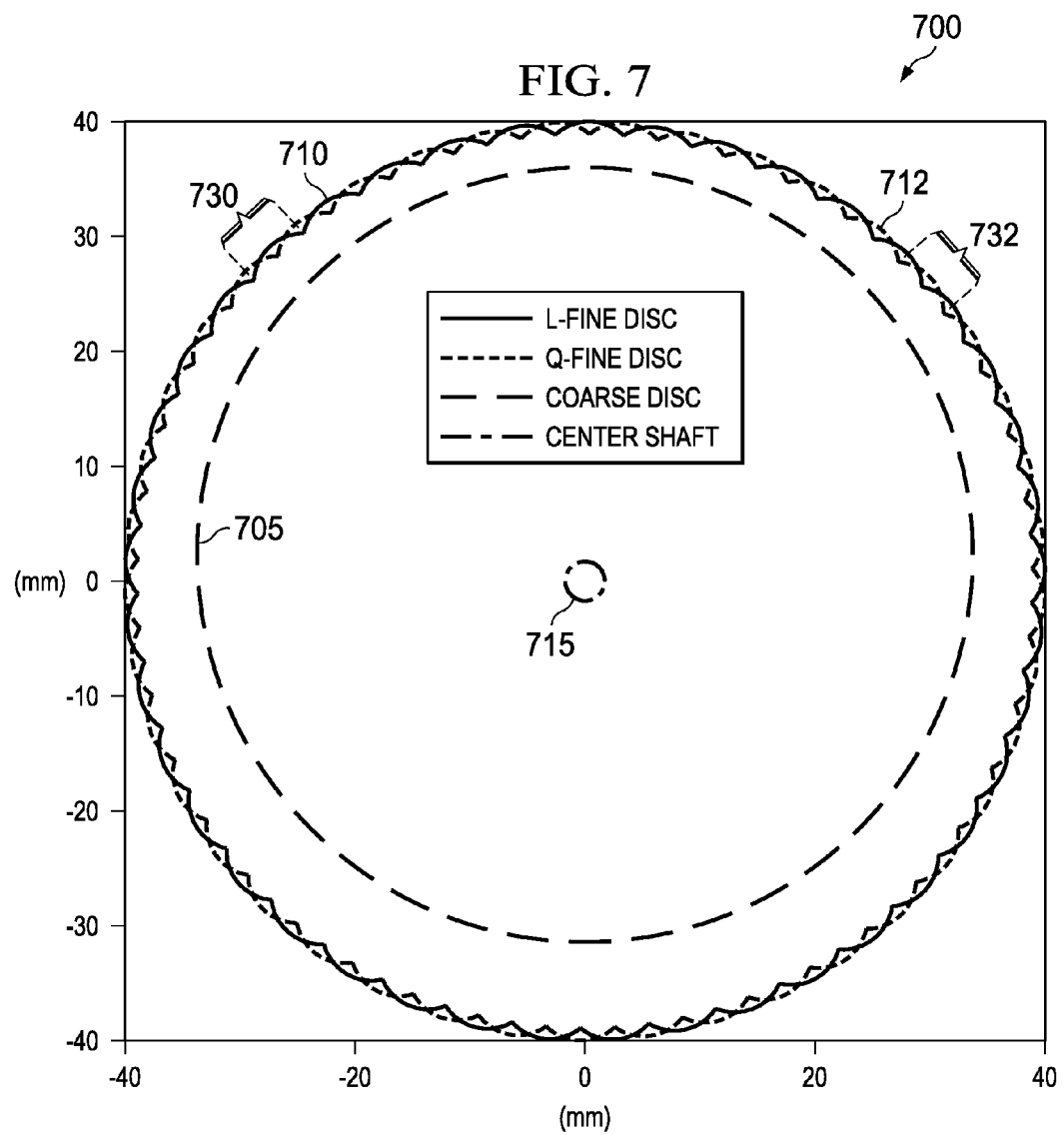
Figures 8, 9, 10:
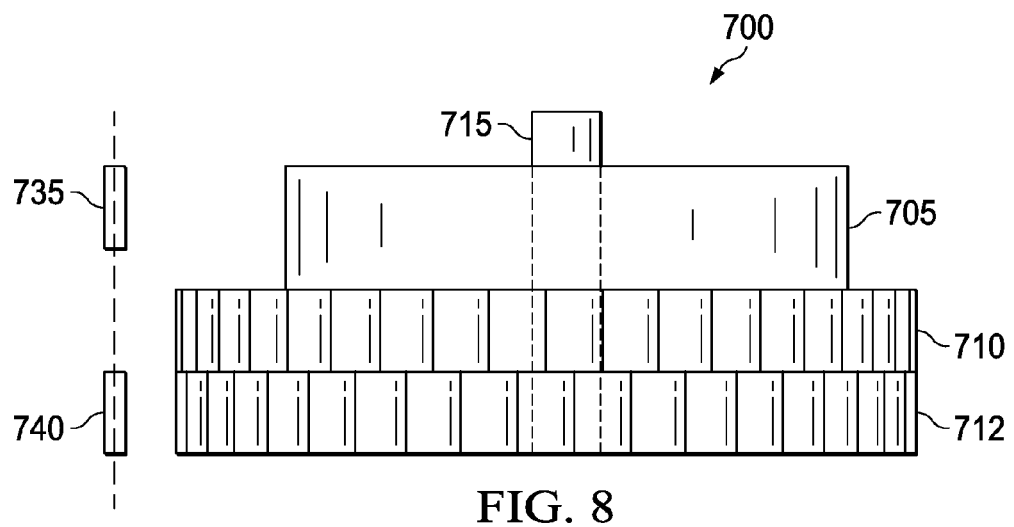

Having thus described the invention in general terms, reference will now be made to the accompanying drawings, wherein:

FIG. 1 is an environmental view showing a rotational resolver disposed in a rotational position and speed sensing system, in accordance with some embodiments;

FIG. 2 is a diagrammatic plan (top) view of an example multi-level high resolution rotation position and speed sensing rotational resolver using inductive sensors, according to various embodiments;

FIG. 3 is a diagrammatic side (elevation) view of the example multi-level high resolution rotation position and speed sensing rotational resolver of FIG. 1, according to various embodiments;

FIG. 4 is a diagrammatic (top) plan view of another example multi-level high resolution rotation position and speed sensing rotational resolver using inductive sensors, according to various embodiments;

FIG. 5 is a diagrammatic side (elevation) view of a third example multi-level high resolution rotation position and speed sensing rotational resolver using inductive sensors, according to various embodiments;

FIG. 6 is a diagrammatic side (elevation) view of a fourth example multi-level high resolution rotation position and speed sensing rotational resolver using inductive sensors, according to various embodiments;

FIG. 7 is a diagrammatic plan (top) view of an example alternative multi-level high resolution rotation position and speed sensing rotational resolver using inductive sensors, according to various embodiments;

FIG. 8 is a diagrammatic side (elevation) view of the example alternative multi-level high resolution rotation position and speed sensing rotational resolver of FIG. 7, according to various embodiments;

FIG. 9 tabulates an example calculated maximum rotational speed for a multi-level high resolution rotation position and speed sensing rotational resolver using inductive sensors, in accordance with some embodiments; and FIG. 10 tabulates an example calculated maximum resolution for a multi-level high resolution rotation position and speed sensing rotational resolver using inductive sensors, in accordance with the same embodiments as FIG. 9.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

The present disclosure relates to apparatus and methods for rotational resolvers (encoders) based on inductive sensing, including multi-level resolution using a multi-disc configuration. Such a resolver includes coarse and fine rotating discs on a single shaft (x-y planar rotation), with respective axial in phase (I) and quadrature (Q) inductive sensing coils disposed at the disc edges, with the coil axis orthogonal to the disc rotational axis in various embodiments. The coarse disc is eccentric so that disc rotation causes the distance between the disc edge and its I coil(s) and Q coil(s) (along the z-axis of a plane of the coil(s)) to cycle between maximum and minimum distances each rotation cycle. The fine disc is configured with a number (n) of angular edge segments that are substantially semicircular, so that disc rotation causes the distance between the disc edge and its I coil(s) and Q coil(s) (along the z-axis) to cycle from maximum to minimum and back to maximum distances (i.e. trough/crest/trough) for each segment, corresponding to n cycles per rotation cycle.

Rotational encoding herein is implemented using a quadrature approach. Sensor coil sets, I and Q, are placed along edges of the fine and coarse discs (rotating targets). This arrangement enables the detection of angle and rotation direction of the discs. This I-Q sensor arrangement can measure absolute rotation angle around 360°. Resultant output waveforms resemble sine (and/or cosine) functions, which enables the use of trigonometric functions to process the data and find a rotation angle from the output.

The inventors hereof have recognized various advantages of multi-level inductance to digital converter resolvers. In a multi-level (n) inductance to digital converter sensor system the resolution requirement may be reduced by as much as $P^1-1/n$ times (where P is the resolution). This translates to a less demanding trade-off between speed and resolution, and less sensitivity to mechanical variation and temperature change. For example, for a two-level 8192-position resolver: a inductive to digital converter can support rotational speed on the order of 340 rpm; a one percent change in axial proximity may cause position error in an order of magnitude of 1; and, when temperature changes 70° C., the position error is in an order of magnitude of 0.1. As a further example, in a 3-level 8192-position resolver: an inductive to digital converter can support rotational speed on the order if 1500 rpm; a one percent change in axial proximity may cause position error on an order of magnitude of 0.25; and when temperature changes 70° C., the position error is on the order of magnitude of 0.025.

FIG. 1 is an environmental view showing rotational resolver 105 disposed in a rotational position and speed sensing system 100, in accordance with some embodiments. Rotational position and speed sensing system 100 may include inductance to digital converter 110, a plurality of inductance tank circuits (e.g. coils 115 through 130 and capacitors 135 through 150) and rotational resolver(s) 105 operatively coupled to the inductance to digital converter 110, via the plurality of inductance tank circuits. In system 100, rotational resolver 105 may include, as detailed below, a rotational shaft, one or more conductive eccentric coarse resolution discs fixed on the shaft, and one or more conductive fine resolution discs, also fixed on the shaft.

The principle of inductive position sensing is related to the phenomenon of eddy currents. When a metal, such as the conductive resolver discs, is placed in close proximity to the coil of an oscillating LC tank (e.g. coils 115 through 130 and capacitors 135 through 150), the induced current in the metal produces a counter field that reduces the effective inductance of the coil(s), thus changing the resonant frequency. The inductance to digital converter (110) detects the inductance change by measuring the resonating frequency of the LC tank (e.g. coils 115 through 130 and capacitors 135 through 150), thus measuring the proximity between the coil and the target metal (e.g. conductive resolver disc. That is, the inductance to digital converter (110) measures the sensor oscillation frequency to determine the position of the target. The inductance to digital converter (110) passes the frequency data to a microprocessor or similar electronic circuitry (155), which may in turn communicate with other equipment (e.g. a host platform, a computer, etc.) sending the frequency data.

FIG. 2 is a diagrammatic plan (top) view of example multi-level high resolution rotation position and speed sensing rotational resolver 200 using inductive sensors, according to various embodiments. FIG. 3 is a diagrammatic side (elevation) view of example multi-level high resolution rotation position and speed sensing rotational resolver 200 of FIG. 2, according to various embodiments. The illustrated example of FIGS. 2 and 3 is a two level, coarse and fine, resolver with axial sense coils. Multi-level inductance to digital converter resolver 200, which may act as an absolute encoder, may be, as illustrated in FIG. 3 a two-level inductance to digital converter based resolver with two discs 205 and 210 mounted on the same shaft 215. Level 1 eccentric coarse resolution disc 205 resolves the angle of the active level 2 "teeth," while level 2 resolves an offset angle. The discs in this, and/or other embodiments, (or at least frames of each disc) may be made of aluminum, solid material is only needed at the outer radius, such as at least the outside 2 mm of the disc. Imbalance in the coarse disc, due to its eccentric nature, may be compensated for by through holes in the disc, to balance it through the axis of the shaft.

Rotational resolver 200 may include rotational resolver coarse-disc sensing coil(s), which in-turn may include (a) pair(s) of coarse-disc sensing coils that have an in-phase (I) coarse-disc sensing coil (220) and a quadrature (Q) coarse-disc sensing coil (235). Fine-disc sensing coils may include pair(s) a pair of coils made up of an in-phase (I) fine-disc sensing coil (235) and a quadrature (Q) fine-disc sensing coil (240).

As mentioned coarse resolver disc 205 is eccentric, such that rotation of disc 205 changes edge position relative to I and Q coils 220 and 225, respectively. The edge position changes are relatively low frequency. This eccentricity may be provided by disposing a generally circular disc on shaft 215, off-center with respect an axis of central shaft 215. Alternatively, the eccentricity may be provided by the coarse disc itself being eccentric (i.e. being generally cam-shaped). The coarse resolution disc can be generalized as a disc shape that causes monotonically decreasing distance to a respective coarse disc sensing coil in a first half-cycle of rotation (e.g. zero to 180 degrees), and monotonically increasing distance in the second half of the rotation cycle (e.g. 180 to 360 degrees). A shaped disc may result in a more linear relationship between the angle and the sensor output than an off-centered circular disc arrangement.

Fine disc 210 has scalloped, or otherwise alternatingly regularly protruding, edge segments 230 (or "teeth") that rotate past I and Q coils 235 and 240, respectively, with cyclical, generally sinusoidal-like, changes in position for each segment. These cycles are relatively high frequency (e.g. with respect to the position changes of coarse resolver disc 205 relative to I and Q coils 220 and 225).

As noted, edge segments 230 can be configured with a semicircular profile. Alternatively, because inductive sensors, such as coils 220, 225, 235 and 240, have sensitivity that decreases with distance, both coarse disc 205 and fine disc 210 may be shaped such that sensor response is substantially linear with rotation. This may be achieved through dynamic range optimization by altering the change in distance for each degree of rotation such that when the disc is close (and the sensor has high sensitivity) the change in distance is small, while when the disc is further away (and the sensor has lower high sensitivity) the change in distance is increased. Hence, the generally parabolic shape of edge segments 230 shown in FIG. 2 may implement this dynamic range optimization. That is, when the disc is close to the sensor (top of an edge segment faces a coil) one degree of rotation results in a relatively small change in distance between disc and sensor, compared to when a bottom of an edge segment (largest distance) is nearing alignment with the axis of the sensor where the slope of the edge segment is much steeper.

Reference coils 245, 250, 255 and 260 may be used for calibration, temperature compensation, and/or the like. In accordance with various implementations, four or more coils, such as coils 220, 225, 235 and 240, may be used for position sensing while in such implementations four other coils (e.g. coils 245, 250, 255 and 260) may be used for calibration and/or compensation (e.g. temperature compensation), and/or the like. Compensation/calibration coils 245, 250, 255 and 260 can be located anywhere that has the same ambient temperature, etc. as experienced by I and Q coils 220, 225, 235 and 240, such as in a same rotational resolver housing (such as discussed below), in an adjacent Printed Circuit Board (PCB) location, or the like. The four sensor coils 220, 225, 235 and 240 (and/or calibration coils 245, 250, 255 and 260 may be printed on inner layers, layer 2 and layer 3, of a coil board PCB. Each coil may contain two layers of printed spiral coils, connected in series to maximize the inductance. The thickness of the coils in this, and other embodiments may be based upon the thickness of the PCB (and/or PCB layer) mounting them, such as, by way of example approximately two millimeters. While four coils are illustrated in FIGS. 2 and 3, it should be appreciated that any number of coils may be used in accordance with the present multi-level high resolution rotation position and speed sensing rotational resolver using inductive sensors. Generally, sensing coils 220, 225, 235 and 240 can be axial coils, with the coil axis orthogonal to the disc rotation axis, measuring z-axis changes in position, or lateral coils, with the coil axis parallel to the disc rotation axis, measuring x-y changes in disc area under the edge coil within a sensing area. Lateral coils are coiled co-planar with the rotating discs such that the disk edge (coarse or fine) rotates through a sensing area of concentrated magnetic flux characterized by magnetic field magnitude vectors that intersect the sensing area with a normal component that is substantially greater than an associated tangent component. In lateral coils, sensing depends upon the disc area within the sensing area, as described in the commonly-assigned U.S. application Ser. No. 14/139,701, the disclosure of which is incorporated by reference herein, in its entirety. However, in accordance with the present systems and methods axial coil sensors may be advantageous compared to lateral coil sensors because mechanical error is less in such embodiments.

Advantageously, use of in-phase (I) and quadrature phase (Q) sensor coils eliminates or greatly reduces the need for calibration and reduces thermal drift. Assuming good matching between the inductor coils, position may be measured based on a differential measurement of inductance (L), given by:

$$(L_I - L_Q)/(L_I + L_Q).$$

This is a significant advantage over magnet-based position sensors, such as Hall effect-based implementations that cannot take advantage of matching sensors (coils) since no two magnets match. A further advantage in use of in-phase and quadrature phase sensors is that direction of rotation can be determined. For example The I-channel will lead in phase over the Q channel when rotating in one direction, while in the reverse direction, the Q-channel will lead in phase over the I-channel. Further, use of in-phase and quadrature phase sensor coils, as used in the present apparatus, systems and methods, provide redundancy. If one of the sensors ceases to function or provide a signal, a single channel version remains. While accuracy may be diminished, the system may remain sufficiently operational, which may be important in critical applications.

For the coarse disc, a coarse level calculation of the shape may be provided by a resulting radian of the coarse level disc. The coarse and fine disc radius can be expressed using one formula:

$$r = r0 + f(N\theta)$$

where r0 is the base radius, f is a periodic function having a period of 360 degree. N is the number of "teeth" in that disc. $\theta$ is the physical angle; $N\theta$ represents the electrical phase. The requirement of the function f( ) is 1) periodic; 2) monotonically increasing in the first half (0-180 degrees); and 3) monotonically decreasing in the second half (180-360 degrees), for example a sinusoidal transfer.

For absolute detection of the absolute angle of the coarse disc, one linear period (up-and-down) is modulated to the fixed radian of the coarse disc. In one possible implementation where the sine function is used as f( ) only the positive half of the sine function is used for each tooth the number of teeth per revolution is set as N. The above equation yields elliptic curves on the coarse disc. The resulting accuracy, assuming a mechanical tolerance of less than 50 um results in a fine disc accuracy of 2.5 mm/50 um, or 50 steps and a coarse disc accuracy of about 5 mm/30/50 um or about 3.3 steps per sector, which is sufficient to detect a sector. This provides a total accuracy of about 1500 points, per 360 degrees, without calibration and/or linearization of the system. In illustrated rotational resolver 200 of FIGS. 2 and 3, the total points are N*50, or N*50/360 points/degree.

In application of rotational resolver 200 of FIGS. 2 and 3, to system 100 of FIG. 1, conductive coarse-disc sensing coil(s) 220 and 225 are disposed adjacent an edge of the coarse resolution disc 205 such that rotation of shaft 215, and thereby discs 205 and 210, cause the distance between each coarse-disc sensing coil 220 and 225 and coarse resolution disc 205 to cycle between a maximum distance and a minimum distance each rotation cycle, resulting in output of an inductance signal to inductance to digital converter 110 corresponding to one sensing cycle per rotation cycle. Conductive fine-disc sensing coil(s) 235 and 240 are disposed adjacent the edge of fine resolution disc 210 such that rotation of shaft 215, and thereby discs 205 and 210, cause the distance between each fine-disc sensing coil 235 and 240 and the fine resolution disc 210 to cycle between a maximum, a minimum and back to the maximum during the passage of each edge segment 230, causing output of a periodic inductance signal to inductance to digital converter 110. This signal corresponds to a rotational position of the discs.

FIG. 4 is a diagrammatic (top) plan view of another example multi-level high resolution rotation position and speed sensing rotational resolver 400 using inductive sensors, according to various embodiments. Example, resolver 400 uses coarse and fine discs 405 and 410, respectively, with solid shaft 415. In this particular illustrated example (which, as the other FIGURES, is not to scale) coarse disc 405 has a diameter of 72 mm, with a modulation (linear offset) of 5 mm. In this example the thickness (or height) of the coarse disc is 16 mm (14 mm+2 mm). Regardless, the disc thickness(es) should be greater than the respective coil diameter(s). In the example of FIG. 4 the four coarse disc coils 420, 422, 425 and 427 have a diameter of 10 mm and a phase shift of 90 degrees (i.e. they are spaced around coarse disc 405 with I/Q pairs 90 degrees apart). Fine disc 410 has a diameter of 80 mm in this example, with a modulation (scallop size) of 2.5 mm (shaped to provide absolute value of cosine). The number of "teeth" 430 on fine disc 410 in this example is thirty and the height (thickness) of fine disc 410 is 8 mm (6+2 mm). The four fine disc coils, 435, 437, 440 and 442, in the example of FIGURE C each have a diameter of 4 mm and are deployed to have a phase shift of 21 degrees. That is, I/Q pairs of fine disc coils are deployed such that coils of each pair are spaced apart 21 degrees from one another around fine disc 410, and the pairs may be disposed generally diametrical to each other across fine disc 410. The period of fine disc 410 in this example is 360/30 equaling 12 physical degrees, or 360 electric degrees. The I and Q coils should be apart by +/−90+/−m*360 electric degrees (wherein m is any integer), or +/−3+/−m*12 physical degrees. So, if the I coil is at 0 degree and the Q coil is at 2 periods minus ¼ period, which will be 21 degrees, the electrical phase between them will be 90 degrees. Further, in accordance with this example, and other embodiments, the coarse disc's radius may be smaller than the fine disc's radius by the size of the fine disc coil diameters. Also in this, and other, example embodiments the distance from a disc frame (not shown in this figure) to vertical fine disc coils 435, 437, 440 and 442 coils is 0.1 to 1 mm (i.e. less than one millimeter).

FIG. 5 is a diagrammatic side (elevation) view of another example multi-level high resolution rotation position and speed sensing rotational resolver 500 using inductive sensors, according to various embodiments. FIG. 5, similar to the other FIGURES, is not to scale. In particular, in FIG. 5 the z-axis is stretched. For example, resolver 500 uses coarse and fine discs 505 and 510, respectively, with solid shaft 515. In this particular illustrated example, coarse disc 505 has a diameter of 67 mm, with a modulation (linear offset) of 4 mm, and in this example, the thickness (or height) of the coarse disc is also 16 mm (14 mm+2 mm) and the four coarse disc coils (520, generally) also have a diameter of 10 mm. Fine disc 510 has a diameter of 80 mm in this example also. The four fine disc coils (535, generally), in the example of FIG. 5 each have a diameter of 4 mm. Thus, in accordance with this example also, the coarse disc's larger radius may be smaller than the fine disc's radius by the size of the fine disc coil diameters (in this case, as in FIG. 4, 4 mm).

Also in this, and other, example embodiments, as mentioned the distance from fine disc (frame) 51 to vertical fine disc coils 535 is 0.1 to 1 mm (i.e. less than one millimeter). In the example embodiment of FIG. 5 coarse disc coils 520 are spaced 18 mm (16 mm plus 2 mm for the PCB thickness) inward from housing 565. This is approximately three times the maximum distance between coarse disc coil 520 and the coarse disc 505. The fine disc coil distance to housing 565 is 14 mm (12 mm plus 2 mm), which is about four times the maximum distance between fine disc 410 (between scallops 530) and fine disc coil 535 (3.5 mm).

Housing 565 in the example of FIG. 5 (and any housing for other examples) may be made of metal to shield the coils from external moving metals. Shaft 515 may be solid or hollow, but should have maximum z-axis play less than a fraction of a millimeter. Run-out of the assembly should be as low as practical and may be a function of minimum distance between coils and discs, including tolerances.

FIG. 6 is a diagrammatic side (elevation) view of another example multi-level high resolution rotation position and speed sensing rotational resolver 600 using inductive sensors, according to various embodiments. FIG. 6 is also not to scale, also with the z-axis stretched. Example, resolver 600 uses coarse and fine discs 605 and 610, respectively, with solid shaft 610. In this particular illustrated example, coarse disc 605 has a radius that is the same as fine disc 610, by way of example 40 mm. The thickness (height) of coarse disc 605 is by way of example 20 mm (i.e. double the coarse disc coil size of 10 mm). In this example, coarse disc coils (620, generally) are mounted at a same radius (from the axis shaft) as the fine disc coils (635, generally) (i.e. 40 mm, plus less than one millimeter). While example rotational resolver 600 of FIG. 6 may employ a larger housing (665) that example rotational resolver 500 of FIG. 5, rotational resolver 6 advantageously mounts coarse and fine disc coils (620 and 635), at a same radius, simplifying PCB layout and mounting, such as use of a single PCB for both the course and fine coils (620 and 635).

FIG. 7 is a diagrammatic plan (top) view of an example alternative multi-level high resolution rotation position and speed sensing rotational resolver 700 using inductive sensors, according to various embodiments. FIG. 8 is a diagrammatic side (elevation) view of example alternative multi-level high resolution rotation position and speed sensing rotational resolver 700 of FIG. 7, according to various embodiments. The illustrated example of FIGS. 7 and 8 is an alternative coarse and fine resolver with axial sense coils. Multi-level inductance to digital converter-based resolver 700, which may act as an absolute encoder, may, as best seen in FIG. 8, have three discs, coarse resolution disc 705, first fine resolution disc 710 and second fine resolution disc 712, all mounted on the same shaft, 715. Level 1 eccentric coarse resolution disc 705 again resolves the angle of the active level 2 "teeth" of fine resolution discs 710 and 712, while fine resolution disc 710 resolves a first offset angle and fine disc 712 resolves a second offset angle.

Again, eccentric coarse resolver disc 705 is disposed on shaft 715 such that rotation of disc 705 changes edge position relative to I and Q coils for the coarse disc (not shown) such as may be accomplished as discussed above. As before, the edge position changes are relatively low frequency. Rotational resolver 700 employs separate fine discs 710 and 712. Each has similar scalloped, or otherwise having alternatingly regularly protruding, edge segments 730 and 732, respectively. However, fine discs 720 and 722 are mounted such that one fine disc outputs a full sine period per tooth and the other fine disc outputs a full cosign period per tooth as they rotate past I and Q coils 735 and 740, respectively. These cycles are relatively high frequency (e.g. with respect to the position changes of coarse resolver disc 705 relative to its I and Q coils). Advantageously, I and Q coils 735 and 740 for fine gain output from fine discs 710 and 712 may be mounted, inline, at a same angular position, with respect to the resolver discs, minimizing mechanical phase shift, making sharing of a same PCB possible, and hence may be easier to realize mechanically.

In application of rotational resolver 700 of FIGS. 7 and 8, to system 100 of FIG. 1, one of the fine resolution discs (710, for example) may be disposed in-phase, and the other fine resolution disc (712, for example) may be disposed in quadrature with respect to the first fine resolution disc (710, in this example). In such systems, rotation of shaft 715 and thereby the discs cause the distance between each fine-disc sensing coil 735 and 740 and the fine resolution discs to cycle between a maximum, a minimum and back to the maximum during the passage of each edge segment (730 and 732), and the conductive coil(s) (735) disposed adjacent the edge of one of the fine resolution discs (710) outputs a generally sinusoidal-like cyclic first signal to the inductance to digital converter and the other conductive coil(s) (740) disposed adjacent the edge of the other fine resolution disc (712) outputs a generally sinusoidal-like cyclic second signal, which is generally quadrature to the first signal. These signals are output to inductance to digital signal converter 110. In such systems, the rotational resolver coarse-disc sensing coil(s) may include (a) pair(s) of coarse-disc sensing coils having an in-phase (I) coarse-disc sensing coil and a quadrature (Q) coarse-disc sensing coil. Also, (a) pair(s) of fine-disc sensing coils may have an in-phase (I) fine-disc sensing coil 735 and a quadrature (Q) fine-disc sensing coil 740. Most notably, in such systems, the in-phase (I) fine-disc sensing coil 735 is disposed adjacent to one of the fine resolution discs (710) and the quadrature (Q) fine-disc sensing coil 740 is disposed adjacent to the other fine resolution disc (712). These coils may be generally aligned with one another and disposed in a generally parallel arrangement to the rotational resolver shaft (715).

Advantageously, by having two fine resolution discs (710 and 712) stacked together and 90-electric-degree out of phase with each other, the fine resolution I and Q coils can be located in a same, aligned position, on one PCB, eliminating any need to separate them by, for instance, +/−3+/−m*12 degrees, as discussed above, which may require tighter mechanical tolerance.

FIG. 9 tabulates an example calculated maximum rotational speed for a multi-level high resolution rotation position and speed sensing rotational resolver using inductive sensors based upon use in conjunction with an inductance to digital converter, in accordance with some embodiments. FIG. 10 tabulates an example calculated maximum resolution for a multi-level high resolution rotation position and speed sensing rotational resolver using inductive sensors based upon use in conjunction with an inductance to digital converter, in accordance with the same embodiments as FIG. 9.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A rotational resolver comprising:
   a rotational shaft;
   at least one conductive eccentric coarse resolution disc fixed on the shaft; and
   at least one conductive fine resolution disc fixed on the shaft, the fine resolution disc defining a plurality of generally semicircular protruding edge segments;
   the fine resolution disc to provide a rotational resolution that is greater than the coarse resolution disc;
   at least one conductive coarse-disc sensing coil disposed adjacent an edge of the coarse resolution disc; and
   at least one conductive fine-disc sensing coil disposed adjacent the edge of the fine resolution disc.

2. The rotational resolver of claim 1, wherein the coils are oriented for axial sensing of the respective disc.

3. The rotational resolver of claim 1, wherein rotation of the shaft and thereby the discs causes the distance between each coarse-disc sensing coil and the coarse resolution disc to cycle between a maximum distance and a minimum distance each rotation cycle, corresponding to one sensing cycle per rotation cycle.

4. The rotational resolver of claim 3, wherein rotation of the shaft and thereby the discs causes the distance between each fine-disc sensing coil and the fine resolution disc to cycle between a maximum, a minimum and back to the maximum during the passage of each edge segment, corresponding to a number of sensing cycles per rotation cycle equal to the number of edge segments.

5. The rotational resolver of claim 1 wherein the at least one coarse-disc sensing coil comprises at least one pair of coarse-disc sensing coils comprising an in-phase coarse-disc sensing coil and a quadrature coarse-disc sensing coil, and the at least one fine-disc sensing coil comprises at least one pair of fine-disc sensing coils comprising an in-phase fine-disc sensing coil and a quadrature fine-disc sensing coil.

6. The rotational resolver of claim 1, wherein the at least one conductive fine resolution disc comprises a pair of conductive fine resolution discs, with a first of the fine resolution discs disposed in-phase and a second of the fine resolution discs disposed in quadrature with respect to the first fine resolution disc.

7. The rotational resolver of claim 6, wherein rotation of the shaft, and thereby the discs, causes the distance between each fine-disc sensing coil and the fine resolution disc to cycle between a maximum, a minimum and back to the maximum during the passage of each edge segment, and the one or more conductive coils disposed adjacent the edge of one of the first or second fine resolution discs outputting a generally sinusoidal-like cyclic first signal and another of the one or more conductive coils disposed adjacent the edge of the other of the first or second fine resolution discs outputting a generally sinusoidal-like cyclic second signal that is generally quadrature to the first signal.

8. The rotational resolver of claim 7 wherein the at least one coarse-disc sensing coil comprises at least one pair of coarse-disc sensing coils comprising an in-phase coarse-disc sensing coil and a quadrature coarse-disc sensing coil, and the at least one fine-disc sensing coil comprises at least one pair of fine-disc sensing coils comprising an in-phase fine-disc sensing coil and a quadrature fine-disc sensing coil, the in-phase fine-disc sensing coil disposed adjacent to one of the first or second fine resolution discs and the quadrature fine-disc sensing coil disposed adjacent to the other of the first or second fine resolution discs.

9. The rotational resolver of claim 8 wherein the in-phase fine-disc sensing coil and the quadrature fine-disc sensing coil are aligned with one another, generally parallel to the shaft.

10. A method for rotational position sensing comprising:
  mounting an eccentric conductive coarse resolution disc, on a shaft;
  mounting a conductive fine resolution disc defining a plurality of generally semicircular protruding edge segments on the shaft;
  the fine resolution disc to provide a rotational resolution that is greater than the coarse resolution disc;
  disposing at least one pair of orthogonally positioned conductive coarse-disc sensing coils adjacent an edge of the coarse resolution disc for axial sensing of the coarse resolution disc; and
  disposing at least one conductive fine-disc sensing coil adjacent the edge of the fine resolution disc for axial sensing of the fine resolution disc.

11. The method of claim 10 further comprising
  rotating the shaft and thereby the discs, causing the distance between each coarse-disc sensing coil and the coarse resolution disc to cycle between a maximum distance and a minimum distance each rotation cycle, corresponding to one sensing cycle per rotation cycle, and causing the distance between each fine-disc sensing coil and the fine resolution disc to cycle between a maximum, a minimum and back to the maximum during the passage of each edge segment, corresponding to a number of sensing cycles per rotation cycle equal to the number of edge segments;
  sensing by each of the conductive coarse-disc sensing coils the one sensing cycle per rotation cycle; and
  sensing by each of the one or more conductive fine-disc sensing coils a plurality of sensing cycles per rotation corresponding to a rotational position of the discs.

12. The method of claim 10, wherein each pair of orthogonally positioned conductive coarse-disc sensing coils comprises an in-phase coarse-disc sensing coil and a quadrature coarse-disc sensing coil, and the at least one fine-disc sensing coil comprises at least one pair of fine-disc sensing coils comprising an in-phase fine-disc sensing coil and a quadrature fine-disc sensing coil.

13. The method of claim 10, further comprising:
  mounting a second conductive fine resolution disc defining a plurality of generally semicircular protruding edge segments on the shaft, with a first of the fine resolution discs disposed in-phase and a second of the fine resolution discs disposed in quadrature with respect to the first fine resolution disc; and
  rotating the shaft, and thereby the discs, causing the distance between each fine-disc sensing coil and an associated fine resolution disc to cycle between a maximum, a minimum and back to the maximum during the passage of each edge segment, the one or more conductive coils disposed adjacent the edge of one of the first or second fine resolution discs outputting a generally sinusoidal-like cyclic first signal and another of the one or more conductive coils disposed adjacent the edge of the other of the first or second fine resolution discs outputting a generally sinusoidal-like cyclic second signal that is generally quadrature to the first signal.

14. The method of claim 13 wherein the at least one fine-disc sensing coil comprises at least one pair of fine-disc sensing coils comprising an in-phase fine-disc sensing coil and a quadrature fine-disc sensing coil and the method further comprises:
  disposing the in-phase fine-disc sensing coil adjacent to one of the first or second fine resolution discs; and
  disposing the quadrature coil fine-disc sensing disposed adjacent to the other of the first or second fine resolution discs, generally aligned with the in-phase fine-disc sensing coil with the in-phase fine-disc sensing coil and the quadrature fine-disc sensing coil generally parallel to the shaft.

15. A rotational position and speed sensing system comprising:
  an inductance to digital converter;
  a plurality of inductance tank circuits; and
  at least one rotational resolver, each operatively coupled to the inductance to digital converter via a plurality of the plurality of inductance tank circuits, the rotational resolver comprising:
    a rotational shaft;
    an eccentric conductive coarse resolution disc fixed on the shaft; and
    a conductive fine resolution disc fixed on the shaft, the fine resolution disc defining a plurality of generally semicircular protruding edge segments;
    the fine resolution disc to provide a rotational resolution that is greater than the coarse resolution disc;
    at least one conductive coarse-disc sensing coil disposed adjacent an edge of the coarse resolution disc such that rotation of the shaft and thereby the discs causes the distance between each coarse-disc sensing coil and the coarse resolution disc to cycle between a maximum distance and a minimum distance each rotation cycle, causing output of an inductance signal to the inductance to digital converter corresponding to one sensing cycle per rotation cycle; and
    at least one conductive fine-disc sensing coil disposed adjacent the edge of the fine resolution disc such that rotation of the shaft and thereby the discs causes the distance between each fine-disc sensing coil and the fine resolution disc to cycle between a maximum, a minimum and back to the maximum during the passage of each edge segment, causing output of an inductance signal to the inductance to digital converter corresponding to a rotational position of the discs.

16. The system of claim 15, wherein the rotational resolver coils are oriented for axial sensing of the respective disc.

17. The system of claim 15, wherein the rotational resolver at least one coarse-disc sensing coil comprises at least one pair of coarse-disc sensing coils comprising an in-phase coarse-disc sensing coil and a quadrature coarse-disc sensing coil, and the at least one fine-disc sensing coil comprises at least one pair of fine-disc sensing coils comprising an in-phase fine-disc sensing coil and a quadrature fine-disc sensing coil.

18. The system of claim 15, wherein the rotational resolver at least one conductive fine resolution disc comprises a pair of conductive fine resolution discs, with a first of the fine resolution discs fixed on the shaft in-phase and a second of the fine resolution discs fixed on the shaft in quadrature with respect to the first fine resolution disc.

19. The system of claim 15 wherein the rotation of the shaft, and thereby the discs of the rotational resolver causes the distance between each fine-disc sensing coil and the fine resolution disc to cycle between a maximum, a minimum and back to the maximum during the passage of each edge segment, and the one or more conductive coils disposed adjacent the edge of one of the first or second fine resolution discs outputs a generally sinusoidal-like cyclic first signal to the inductance to digital converter and another of the one or more conductive coils disposed adjacent the edge of the other of the first or second fine resolution discs outputs a generally sinusoidal-like cyclic second signal, which is generally quadrature to the first signal, to the inductance to digital signal converter.

20. The system of claim 15, wherein the rotational resolver at least one coarse-disc sensing coil comprises at least one pair of coarse-disc sensing coils comprising an in-phase coarse-disc sensing coil and a quadrature coarse-disc sensing coil, and the at least one fine-disc sensing coil comprises at least one pair of fine-disc sensing coils comprising an in-phase fine-disc sensing coil and a quadrature fine-disc sensing coil, the in-phase fine-disc sensing coil disposed adjacent to one of the first or second fine resolution discs and the quadrature fine-disc sensing coil disposed adjacent to the other of the first or second fine resolution discs, generally aligned with the in-phase fine-disc sensing coil and with the in-phase fine-disc sensing coil and the quadrature fine-disc sensing coil disposed generally parallel to the shaft.

* * * * *